(12) United States Patent
Jensen et al.

(10) Patent No.: US 6,724,884 B2
(45) Date of Patent: Apr. 20, 2004

(54) CALL MANAGEMENT SYSTEM USING FAST RESPONSE DYNAMIC THRESHOLD ADJUSTMENT

(75) Inventors: Roy A. Jensen, Westminster, CO (US); William H. Widener, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 238 days.

(21) Appl. No.: 09/947,790

(22) Filed: Sep. 6, 2001

(65) Prior Publication Data

US 2002/0018554 A1 Feb. 14, 2002

Related U.S. Application Data

(63) Continuation-in-part of application No. 09/492,513, filed on Jan. 27, 2000.

(51) Int. Cl.[7] .............................................. H04M 3/00
(52) U.S. Cl. ........................ 379/265.01; 379/265.05; 379/265.11; 379/265.12; 379/265.13
(58) Field of Search ...................... 379/265.01–265.14, 379/266.01–266.1, 309

(56) References Cited

U.S. PATENT DOCUMENTS

| | | | |
|---|---|---|---|
| 4,737,983 A | * 4/1988 | Frauenthal et al. | ......... 379/221 |
| 5,506,898 A | 4/1996 | Costantini et al. | .......... 379/266 |
| 5,590,188 A | * 12/1996 | Crockett | ...................... 379/225 |
| 6,088,441 A | 7/2000 | Flockhart et al. | ........... 379/265 |
| 6,163,607 A | 12/2000 | Bogart et al. | ................ 379/266 |
| 6,272,544 B1 | * 8/2001 | Mullen | ........................ 709/226 |
| 6,278,777 B1 | * 8/2001 | Morley et al. | ............... 379/265 |
| 6,366,666 B2 | * 4/2002 | Bengtson et al. | ...... 379/265.06 |
| 6,510,221 B1 | * 1/2003 | Fisher et al. | ........... 379/265.12 |

* cited by examiner

Primary Examiner—William J. Deane, Jr.
(74) Attorney, Agent, or Firm—Sheridan Ross P.C.

(57) ABSTRACT

A call center includes functionality for dynamically varying a threshold value associated with each of a number of different call types (i.e. skills) to be handled by the call center. A group of agents and a group of reserve agents are provided within the call center for use in handling incoming calls. A dedicated subgroup of agents is assigned to service each of the call types in the call center. In addition, one or more reserve agents are assigned to service a particular call type when an expected wait time associated with the call type exceeds a threshold value. The threshold value associated with each call type is dynamically adjusted during call center operation based on the fraction of the target service level for a call type being achieved by the call center. In one embodiment, a dynamically adjusted threshold is calculated by multiplying an administered threshold value for a call type by the fraction of the target service level that a measured service level for the call type represents.

21 Claims, 3 Drawing Sheets

CALL MANAGEMENT SYSTEM USING FAST RESPONSE DYNAMIC THRESHOLD ADJUSTMENT

CROSS REFERENCE TO RELATED APPLICATIONS

The present application is a continuation in part of U.S. patent application Ser. No. 09/492,513 filed Jan. 27, 2000, entitled "CALL MANAGEMENT SYSTEM USING DYNAMIC THRESHOLD ADJUSTMENT", which is incorporated herein by reference in its entirety.

FIELD OF THE INVENTION

The present invention generally relates to telephone call centers. In particular, the present invention relates to allocating call center personnel to handle different types of telephone calls.

BACKGROUND OF THE INVENTION

A call center is a facility that handles telephone calls for an organization, usually using some level of computer control. Typically, the telephone calls handled by a call center are incoming calls from present or potential customers of the organization. The incoming calls are generally distributed among a number of agents within the call center who are each trained to handle certain types of incoming calls. A call center will normally be capable of handling many different types of calls coming into the organization. For example, a call center may be set up to receive calls relating to each of a multitude of different products, product types, or product families sold by the corresponding organization. Alternatively, or in addition, a call center may be arranged to handle calls relating to different services or information dissemination functions provided by the organization. Some such services/functions include: taking product orders, providing customer service, providing pricing and/or availability information, or any of a variety of other functions. The types of calls that are supported by a call center are commonly referred to as the "skills" of the call center.

It is often desirable that each of the different call types or skills associated with a call center be handled differently by the call center. That is, some of the skills may be deemed by the corresponding organization to be more important than other skills and hence are to be given more attention or better service by the call center. Thus, a service level target is often defined for each of the different skills of the call center to indicate a desired level of service for the skill. However, past techniques for achieving the desired service levels for each of the skills of a call center have generally been inadequate. That is, actual performance levels for the different skills have not accurately reflected the desired service level targets defined for those skills.

In order to meet skill level targets, agents may be assigned to handle incoming calls regarding a particular skill. Agents who have been cross-trained in other skills, or other call center personnel whose primary duties do not involve answering incoming calls, may be designated as reserve agents. When service level targets for a particular skill are not met, personnel classified as reserve agents for that skill may be assigned to answer incoming telephone calls related to that skill.

Computer-based systems for allocating call center personnel to different skills are available. However, such systems have typically utilized thresholds for adding or removing personnel from a particular skill that are at least in part based on previous threshold values. As a result, such systems have been incapable of rapidly adjusting to changes in demand for a particular skill. As a result, adjustments in the staffing of a particular skill typically lag behind changes in demand for that skill. Therefore, the allocation of call center personnel does not track demand, and caller wait times may be greater than or less than targeted wait times.

SUMMARY OF THE INVENTION

The present invention is directed to solving these and other problems and disadvantages of the prior art. Generally, according to the present invention, a system is provided for allocating call center personnel to handle calls of a particular call type (i.e. regarding a particular skill) based on the fraction of the target service level that a measured service level represents. Initially, an administered threshold value is multiplied by this fraction to obtain a dynamically adjusted threshold. If a measured wait time for a call of a first type is greater than the dynamically adjusted threshold, additional call center personnel may be assigned to answer calls of the first type. Alternatively, if the actual wait time for a caller in connection with a call of the first type is less than the dynamically adjusted threshold, call center personnel may be released from handling calls of the first type, and may be assigned to other duties.

In accordance with another embodiment of the present invention, the value obtained by multiplying the administered threshold value by the fraction of the target service level that the measured service level represents is proportioned by a scaling factor. In accordance with a further embodiment of the present invention, the value obtained by multiplying the administered threshold value by the fraction of the target service level that the measured service level represents is normalized by subtracting the administered threshold value, and the result is proportioned by a scaling factor. The proportioned and translated value is then retranslated by adding the administered threshold value.

The present invention provides a dynamically adjusted threshold that does not depend on previous threshold values. Accordingly, the provided dynamically adjusted threshold is capable of changing rapidly in response to changes in measured call center service levels. In response to such changes in the dynamically adjusted threshold, call center personnel may be assigned to calls of the type to which the dynamically adjusted threshold pertains or to other tasks as demand warrants.

These and other advantages and features of the invention will become more apparent from the following description of an illustrative embodiment of the invention taken together with the drawings.

DETAILED DESCRIPTION

Figure 1:
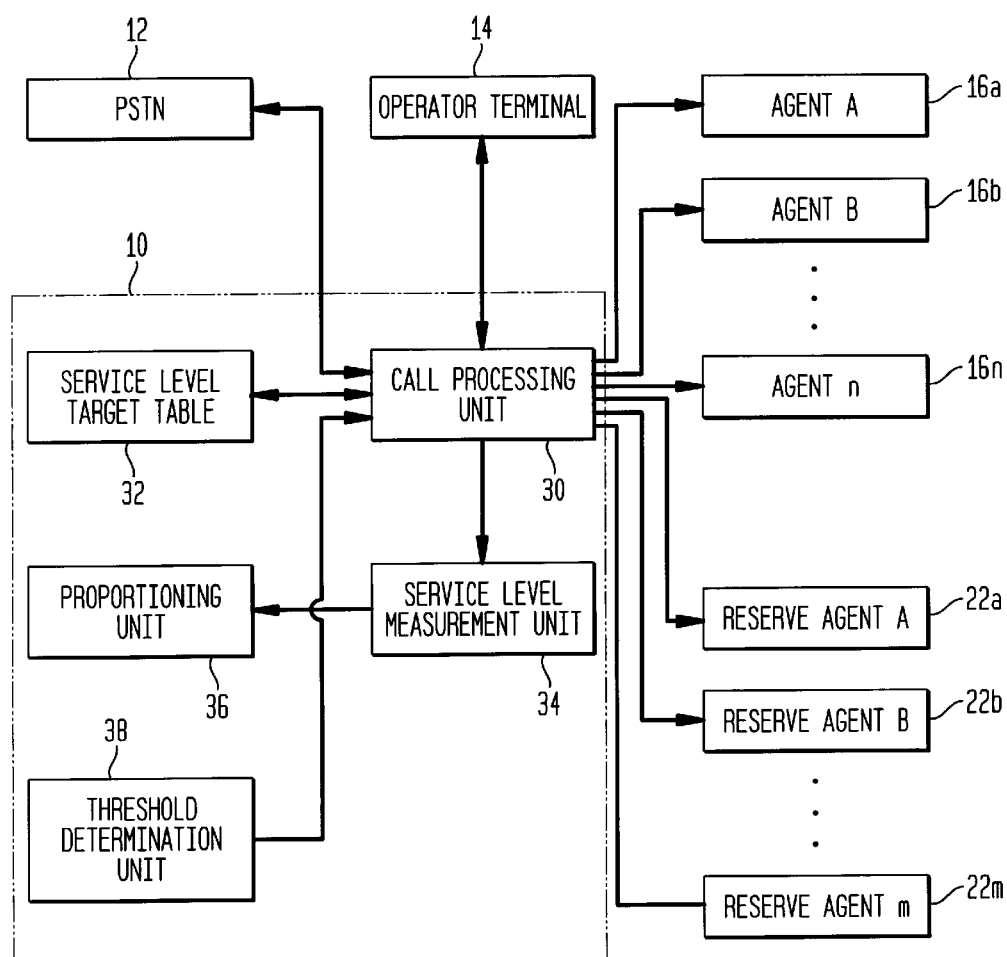
FIG. 1 is a block diagram illustrating a call center that is used to process incoming calls for an organization in accordance with one embodiment of the present invention.

FIG. 1 is a block diagram illustrating a call center 10 that is used to process telephone calls for an associated organization in accordance with one embodiment of the present invention. The call center 10 is coupled to a public switched telephone network (PSTN) 12 through which it receives calls from remote parties. The call center 10 is also coupled to an operator terminal 14 through which a call center operator can program and configure the call center functionality. In addition, the call center 10 is coupled to a plurality of agent stations 16a, 16b, . . . , 16n and a plurality of reserve agent stations 22a, 22b, . . . , 22m to which it directs calls during normal call center operations. Agents and reserve agents are collectively referred to herein as "call center personnel."

As illustrated in FIG. 1, the call center 10 includes: a call processing unit 30, a service level target table 32, a service level measurement unit 34, a proportioning unit 36, and a threshold determination unit 38. The call processing unit 30 is operative for, among other things, receiving telephone calls from the PSTN 12 and for distributing the calls to the agent stations 16a, 16b, . . . , 16n and the reserve agent stations 22a, 22b, . . . , 22m to be handled by call center personnel located at these stations. The call processing unit 30 is also operative for keeping track of call center performance statistics and the like. The remainder of the elements within the call center 10 are used by the call processing unit 30 to determine how the incoming calls are to be distributed. It should be understood that the various blocks within the call center 10 of FIG. 1 are functional in nature and do not necessarily correspond to discrete hardware units. For example, two or more of the functional blocks can be implemented in software within a common digital processing unit.

The call center 10 is capable of handling a large number of different call types or "skills". In general, an individual skill can include any type of call that an organization wishes to differentiate from other call types, for whatever reason. For example, an organization may wish to differentiate between calls related to different product families offered for sale by the organization. Many other ways of defining skills within a call center are also possible. The call processing unit 30 can determine the skill associated with a particular incoming call (i. e. the call type) in any of a number of different ways. For example, in one approach, a caller is presented with an audio menu through which the caller designates the skill associated with the corresponding call. In another approach, a unique telephone number is allocated to each different skill or call type serviced by the call center 10. The call processing unit 30 thus determines the skill or call type associated with a call based on the line through which the call was received. A hybrid approach using both audio menus and multiple phone numbers can also be used. As can be appreciated, many other techniques for determining the skill associated with each incoming call are possible.

In accordance with the present invention, each of the call types supported by the call center 10 is assigned a service level target value that is indicative of a level of service that the corresponding organization wishes to provide for that call type. These service level target values are stored within the service level target table 32. The service level target values can be specified and modified by a call center operator located at operator terminal 14. In a typical implementation, the service level target table 32 is stored within a mass storage device or semiconductor memory associated with the call processing unit 30.

In a preferred embodiment of the invention, each of the agents associated with the agent stations 16a, 16b, . . . , 16n is assigned a subset of call types that are to be serviced during normal call center operations. This subset of call types does not change during normal operation. The call processing unit 30 only distributes calls to an agent that fall within the agent's skill set. In one approach, for example, an individual call queue is maintained for each call type supported by the call center 10. A particular agent, therefore, draws calls from each of the queues within his/her skill set. Typically, when one of the agents in the call center becomes available, that agent will be allocated the oldest call that is in a first position of one of the queues corresponding to that agent.

The reserve agents associated with the reserve agent stations 22a, 22b, . . . , 22m are not assigned a particular set of call types to support during call center operation. Instead, the reserve agents are each assigned a changing set of call types based on system conditions. When a new call associated with a particular skill is received by the call center 10, the call processing unit 30 determines an "expected wait time" for the new call. The expected wait time represents an estimated time that a caller associated with the new call will have to wait before the call is addressed by call center personnel. If the expected wait time exceeds a threshold value, determined as will be explained in detail below, the call processing unit 30 assigns a reserve agent to the associated call type to facilitate the processing of calls of that type. In general, the allocation or reallocation of agents to call types may be performed each time an updated threshold value is calculated. By providing an additional agent (i.e., a reserve agent) to handle calls for the call type, the expected wait times for queued calls within the call type are reduced.

Although the above discussion describes agents and reserve agents as separate entities, it should be appreciated that a single employee can act as an agent for some skills and a reserve agent for other skills from a single station in accordance with the invention. The call processing unit 30 keeps track of which employees are performing dual functions and distributes incoming calls accordingly. In addition, it should be appreciated that multiple threshold values can be maintained and dynamically adjusted for one or more of the skills in the call center in accordance with the present invention. For example, in one embodiment, call center employees are assigned as either level 1 or level 2 reserve agents. A level 1 reserve agent is activated for a skill when the expected wait time for the skill exceeds the level 1 threshold. A level 2 reserve agent is activated for the skill when the expected wait time for the skill exceeds the level 2 threshold. The level 2 threshold is always greater than or equal to the level 1 threshold.

In accordance with the present invention, the threshold value used by the call processing unit 30 to allocate a reserve agent to a call type is a dynamically varying amount. That is, the threshold value associated with a call type is repeatedly modified during system operation (e.g., at predetermined intervals) based on a measured service level being provided for the call type. In addition, in a preferred approach, the threshold value for the call type is varied based on the proportion of the target service level for the call type that is being met by the call center. The service level measurement unit 34 measures a present service level being provided for each of the call types. The proportioning unit 36 then creates a proportion consisting of the weighted service level (WSL) for the call type divided by the target service level (SL) for the call type (recorded in the service level target table 32). The result, which represents the fraction of the target service level being met, is then transferred to the threshold determination unit 38. The threshold determination unit 38 dynamically generates a current threshold for the call type based on the fraction of the target service level being met. Thus, the threshold is changed if the service level target for the skill is not being achieved.

For example, in one approach, the proportion of the target service level that is met by the actual service level is multiplied by the administered threshold value to obtain an updated threshold value. Accordingly, if the fraction of the target service level that is being met by the actual service level is less than one, the threshold for adding or removing call center personnel assigned to service the call type will be less than the administered threshold. Alternatively, if the fraction of the target service level that is being met by the actual service level is greater than one, the threshold for adding or removing call center personnel assigned to the call type will be greater than the administered threshold. By increasing/decreasing the threshold value for the skill, the threshold determination unit 38 is decreasing/increasing the likelihood that a reserve agent will be allocated to the call type. Correspondingly, the service level being provided for the call type will decrease/increase to a value that is closer to the service level target for the call type. The threshold adjustment process is preferably a periodic or continuous process within the call center for each skill.

According to an embodiment of the invention, the service level measurement unit 34 measures a service level associated with each of the call types. The service level measurement unit 34 computes the weighted service level for each call type using an exponential moving average based on the expected wait time for that call type. The weighted service level for each skill is updated periodically (e.g., every 10 seconds). The expected wait time is based on the number of agents eligible to receive a call of a particular type, the number of calls of that type currently queued, and the weighted advance time for the call type. An agent is eligible to receive a call of a particular type if the agent is available and is not reserved for that call type.

Figure 2:
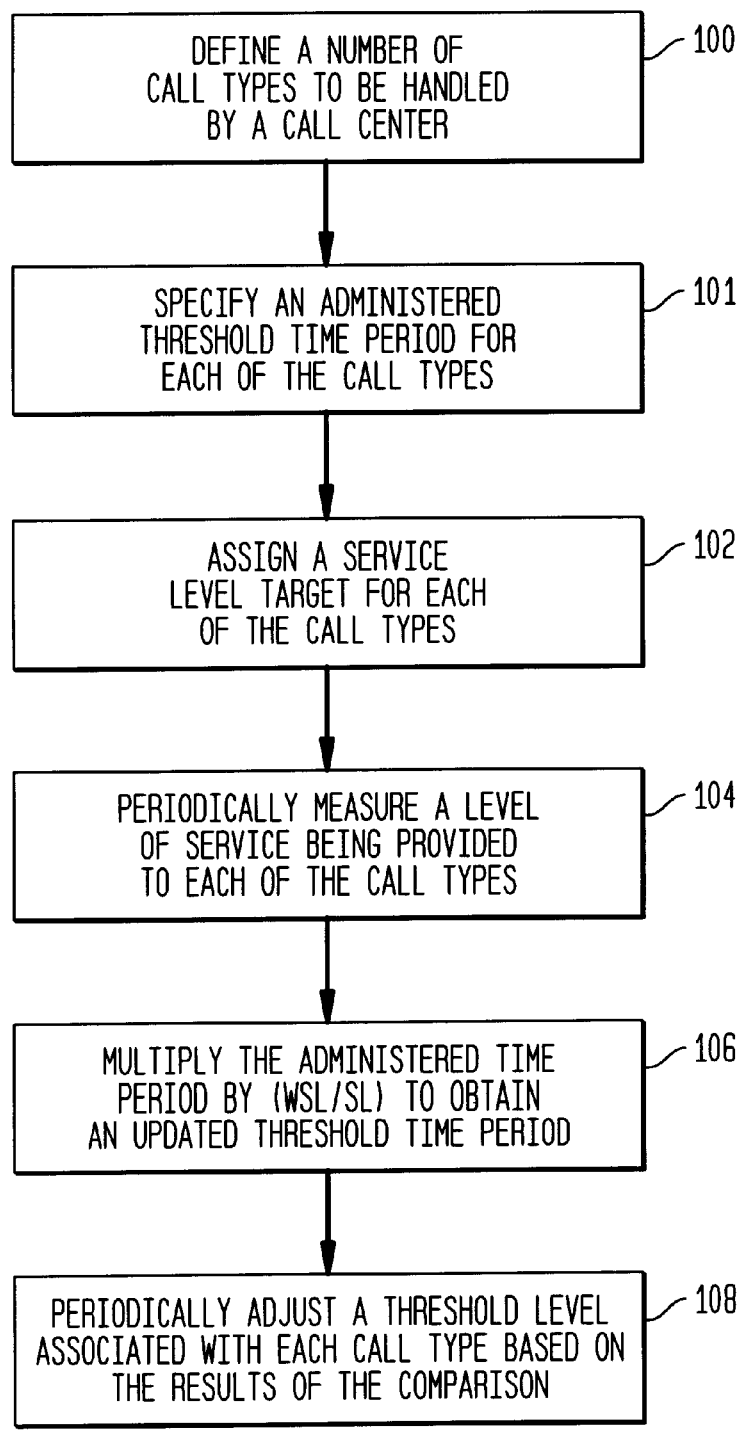
FIG. 2 is a flowchart illustrating a method for managing incoming calls within a call center in accordance with an embodiment of the present invention.

FIG. 2 is a flowchart illustrating a method for managing incoming calls within a call center in accordance with an embodiment of the present invention. First, a number of call types are defined that are to be handled by the call center (step 100). Then, at step 101, an administered threshold time period for each of the defined call types is established. In general, the administered threshold time period represents an amount of time that an average call of a particular type waits in a queue before it receives service. As will be explained in detail below, the administered threshold time period is, at least after the system has been initialized, used to calculate an updated threshold time period, which is in turn used to determine whether a greater or lesser number of call center personnel should be assigned to a call type. Next, a service level target is specified for each of the call types (step 102).

A level of service being provided by the call center for each of the call types is periodically measured during call center operation (step 104). The level of service measured for each of the call types can include the weighted service level measurement discussed previously or any other service level measurement that can be used to gauge a quality of service being provided for a particular call type. Next, the fraction of the service level target for each call type being met by the call center, as indicated by the service level measurement is used to proportion the administered time period to obtain an updated threshold time period (step 106). An updated threshold time period for each of the skills is periodically calculated during call center operation based on the corresponding comparison result. The updated threshold time period for each time period is then used to periodically adjust the staffing of each call type based on the results of the comparison (step 108). In one embodiment, the updated threshold level for each skill is calculated every 60 seconds.

In another embodiment, the updated threshold time period for each call type is calculated every 36 seconds. According to still another embodiment of the present invention, the updated threshold time period for a call type is calculated when the measured service level associated with that call type changes by a specified amount.

Figure 3:
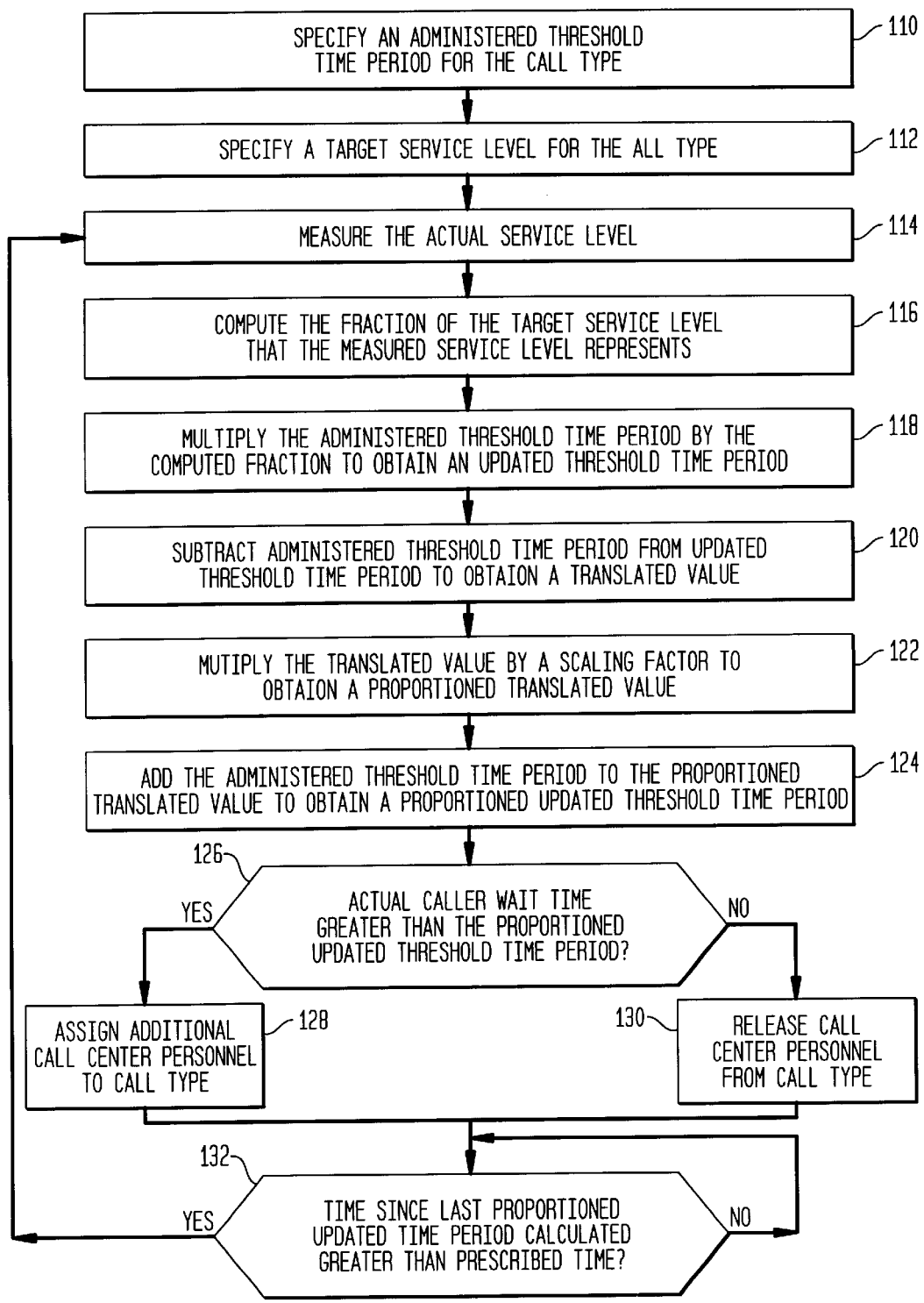
FIG. 3 is a flowchart illustrating a method for dynamically adjusting a threshold level associated with a first skill in a call center in accordance with an embodiment of the present invention.

FIG. 3 is a flowchart illustrating a method for dynamically adjusting a threshold level associated with a first call type or skill in a call center in accordance with an embodiment of the present invention. In particular, FIG. 3 illustrates a method for calculating an updated threshold time period for a call type. Initially, at step 110, an administered threshold time period for the call type is specified. Next, at step 112, a target service level for the call type is specified. Then, the actual level of service associated with the first skill is measured (step 114). The level of service measured for the first skill can include, for example, the weighted service level measurement discussed previously.

Next, at step 116, the fraction of the target service level (SL) that the measured service level (e.g., the weighted service level, WSL) represents is computed. That is, a proportion of the target service level achieved by the call center is calculated by dividing the measured service level (WSL) by the target service level (SL). At step 118, the administered threshold time period ($t_{admin}$) is multiplied by the computed fraction to obtain an updated threshold time period (t) to obtain an updated threshold time period $t_{updated}$. Accordingly, the following equation is used to calculate the updated threshold time period:

$$t_{updated} = t_{admin}(WSL/SL)$$

The updated threshold time period so obtained may, if desired, be scaled to alter the responsiveness of the updated threshold to changes in demand for service related to calls of the subject type. Accordingly, at step 120, the administered threshold time period may be subtracted from the updated threshold time period to obtain a translated value. The translated value may next be multiplied by a scaling factor (p) to obtain a proportioned translated value (step 122). The administered threshold time period may then be added to the proportioned translated value to obtain a proportioned updated threshold time period $t_{scaled}$ (step 124). Expressed in mathematical form, the steps 120, 122 and 124 are as follows:

$$t_{scaled} = (P(t_{updated} - t_{admin}) + t_{admin}).$$

At step 126, the actual caller wait time is compared to the proportioned updated threshold time period ($t_{scaled}$). If the actual caller wait time is greater than the proportioned updated threshold time period, additional call center personnel are assigned to the subject call type (step 128). Alternatively, if the actual caller wait time is less than the proportioned updated threshold time period, call center personnel are released from servicing the subject call type (step 130).

At step 132, a determination is made as to whether the time since the last proportioned updated time period was calculated is greater than a prescribed period of time. If not, the system idles at step 132. If the prescribed period of time has elapsed, the system returns to step 114 to compute the next proportioned updated threshold time period ($T_{scaled}$).

As can be appreciated by one of skill in the art, if scaling of the updated threshold is not required or desired by the operator of the call center, steps 120, 122 and 124 can be eliminated. In that case, at step 126, the actual caller wait time is compared to the updated threshold time period ($t_{updated}$).

From the description set forth above, it can be appreciated that the threshold used to determine whether additional call center agents are assigned to servicing calls of a subject type, or whether agents are released from servicing calls of the subject type is updated periodically. For example, according to one embodiment of the present invention, the threshold value is updated at least once every minute. According to a further embodiment of the present invention, the threshold is updated about once every 36 seconds. According to additional embodiments of the present invention, the threshold is updated in response to a change in a monitored parameter, such as in response to a change in the number of calls of the subject type in the queue.

As can also be appreciated by one of skill in the art, adjustments to the number of call center agents assigned to service calls of the first type can be made if the expected wait time for calls of the first type does not match the proportional updated threshold ($t_{scaled}$), or the updated threshold time period ($t_{updated}$) if additional scaling is not used, by more than a first predetermined percentage or amount. For example, additional call center agents may be assigned to handle calls of the first type if the expected wait time for such calls exceeds the threshold $t_{scaled}$ (or $t_{updated}$) for calls of the first type by more than a specified percentage x. Similarly, call center agents may be assigned to other duties if the expected wait time for calls of the first type is less than the threshold $t_{scaled}$ (or $t_{updated}$) by at least a specified percentage or amount, for example percentage y. The predetermined percentages x and y can be the same value or different values in accordance with a present invention.

The above-described methods can also be implemented within a system that allocates or deallocates varying numbers of call center agents to service calls of a particular type depending on the differences between the calculated threshold ($t_{updated}$ or $t_{scaled}$) and the measured wait time. For example if the measured wait time is no more than 10% greater than the calculated threshold, one additional agent may be assigned to service calls of the call type, while two additional agents may be added if the measured wait time is 10% or more greater than the calculated threshold. Similarly, one agent may be reassigned to other duties if the measured wait time is no more than 5% less than the calculated threshold, while two agents may be reassigned if the measured wait time is at least 5% less than the calculated threshold. Of course, the percentages set forth above are examples, and any percentage or change in the number of agents for a particular percentage may be used. In addition, more than two levels of change may be specified.

The updated threshold time period (or the proportioned updated threshold time period) can also be constrained if desired. For example, constraints may be established by limiting the threshold time period to within specified values. Both minimum and maximum periods may be specified. According to one embodiment, the maximum dynamically adjusted threshold ($t_{updated}$ or $t_{scaled}$) is less than or equal to a specified value $t_{max}$, and the minimum threshold value is set to greater than or equal to a specified value $t_{min}$.

The following example is provided for purposes of illustration only and is not intended to limit the scope of the invention. According to the example, it will be assumed that the administered time period ($t_{admin}$) for a first call type is set to 20 seconds. Furthermore, it will be assumed that the target service level (SL) has been chosen to be 80% of calls of the first type answered within 20 seconds. The dynamic threshold used to determine whether the number of call center personnel assigned to handle calls of the first type should be increased or decreased is calculated every 36 seconds. In order to calculate the dynamic threshold, the actual service level for calls of the first type is determined. For example, if it is determined that the actual service level (WSL) is 60% of calls of the first type are answered within 20 seconds, $$t_{updated} = t_{admin}(WSL/SL) = 20 \text{ sec.}\left(\frac{60\%/20 \text{ sec.}}{80\%/20 \text{ sec.}}\right) = 20 \text{ sec.}(0.75) = 15 \text{ sec.}$$

Thus, an additional call center agent may be assigned to answer calls of the first type if the expected wait time for calls of the first type is greater than 15 seconds.

To continue this example, if additional scaling is employed, for example, using a scaling factor 2(p) of the threshold used to determine whether adjustments to the number of agents assigned to handle calls of the first type ($t_{scaled}$) is calculated as follows:

$$t_{scaled}=(P(t_{updated}-t_{admin})+t_{admin})=2(15-20)+20 \text{ sec.}=10 \text{ sec.}$$

Therefore, after scaling, the actual expected wait time for a call of the first type is compared to a threshold of 10 seconds.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for allocating call center personnel, comprising:
    specifying an administered threshold time period;
    specifying a target service level for a first type of call;
    measuring an actual service level;
    computing a fraction of said target service level achieved by said actual service level;
    multiplying said administered threshold time period by said computed fraction to obtain an updated threshold time period;
    measuring an actual caller wait time; and
    in response to said actual caller wait time having a value exceeding said updated threshold time period, assigning additional call center personnel to answer said first type of call.

2. The method of claim 1, wherein said updated threshold time period is calculated periodically.

3. The method of claim 1, wherein said updated threshold time period is calculated at least once every minute.

4. The method of claim 1, further comprising in response to said updated threshold time period exceeding said actual caller wait time, releasing call center personnel from answering said first type of call.

5. The method of claim 1, further comprising:

subtracting said administered threshold time period from said updated threshold time period to obtain a translated value;

multiplying said translated value by a scaling factor to obtain a proportioned translated value; and adding said administered threshold time period to said proportioned translated value to obtain a proportioned updated threshold time period, wherein said step of assigning additional call center personnel comprises assigning additional call center personnel in response to said actual caller wait time exceeding said proportioned updated threshold time period.

6. The method of claim 5, further comprising releasing call center personnel from answering said first type of call if said actual caller wait time is less than said proportioned updated threshold time period.

7. The method of claim 5, wherein said scaling factor is greater then one.

8. The method of claim 1, further comprising constraining said updated threshold time period to a value less than a specified maximum threshold time period.

9. The method of claim 1, further comprising constraining said updated threshold time period to a value greater than a specified minimum threshold time period.

10. The method of claim 1, wherein said target service level is expressed as a percent of calls of said first type answered within said administered threshold time period; and wherein said actual service level is expressed as a percent of calls of said first type answered within said administered threshold time period.

11. A system for use in allocating call center agents, comprising:

means for distributing calls received from an exterior environment to a plurality of agent stations and a plurality of reserve agent stations based on call type, said means for distributing calls including means for directing calls of a first call type to a reserve agent station within said plurality of reserve agent stations when an expected wait time for said first call type exceeds a dynamically adjusted threshold value calculated for said first call type;

means for measuring a call service level for said first call type;

means for calculating said dynamically adjusted threshold value associated with said first call type, wherein said means for calculating multiplies a specified threshold value by a proportion comprising a measured service level divided by a desired service level to obtain a first result, wherein said dynamically adjusted threshold value is set equal to said first result; and means for measuring a caller wait time experienced in connection with said first call type, wherein at least a first reserve agent is assigned to service calls of said first call type in response to a calculated dynamically adjusted threshold value that is less than said measured call service level for said first call type.

12. The system of claim 11, wherein at least a first reserve agent is assigned to duties other than servicing calls of said first call type in response to a calculated dynamically adjusted threshold value that is greater than or equal to said measured call service level for said first call type.

13. The system of claim 11, wherein said means for calculating said dynamically adjusted threshold value multiplies said first result by a scaling value to obtain a scaled first result, and wherein said dynamically adjusted threshold value is set equal to said scaled first result.

14. The system of claim 11, wherein said means for calculating said dynamically adjusted threshold value subtracts said specified threshold value from said first result to obtain a normalized first result, wherein said means for calculating multiplies said normalized first result by a scaling value to obtain a normalized and scaled first result, wherein said means for calculating adds said specified threshold value to said normalized and scaled first result to obtain a translated first result, and wherein said dynamically adjusted threshold value is set equal to said translated first result.

15. A call center apparatus, comprising:

a service level measurement unit capable of determining at least a measured service level and a caller wait time;

a call allocation units wherein a received telephone call of said first type is allocated to at least one of an available call Center agent and a call queue;

a dynamic threshold calculation unit, wherein a specified agent threshold is multiplied by a ratio of a target service level to said measured service level to obtain a dynamic threshold; and an agent allocation unit, wherein an additional agent is assigned to receive telephone calls of said first type in response to a dynamic threshold that is less than a caller wait time, and wherein an agent assigned to receive telephone calls of said first type is assigned to another duty in response to a dynamic threshold that is greater than a caller wait time.

16. The call center apparatus of claim 15, wherein said dynamic threshold calculation unit comprises a proportioning unit, wherein said dynamic threshold is translated by subtracting said specified agent threshold, multiplied by a scaling factor, and retranslated by adding said specified agent threshold before said dynamic threshold is supplied to said agent allocation unit.

17. The call center apparatus of claim 15, wherein said dynamic threshold is calculated periodically.

18. The call center apparatus of claim 15, wherein said dynamic threshold is calculated at least once a minute.

19. The call center apparatus of claim 15, wherein said dynamic threshold can be no greater than a specified maximum threshold and can be no less than a specified minimum threshold.

20. The call center apparatus of claim 15, further comprising an operator input, wherein at least one of said specified agent threshold and said target service level can be entered by a user.

21. The call center apparatus of claim 15, wherein said scaling factor is greater than one.

* * * * *